United States Patent
Mason et al.

(10) Patent No.: US 12,217,402 B2
(45) Date of Patent: Feb. 4, 2025

(54) DEEP LEARNING BASED IMAGE ENHANCEMENT FOR ADDITIVE MANUFACTURING

(71) Applicant: BWXT Advanced Technologies LLC, Lynchburg, VA (US)

(72) Inventors: Simon Mason, Baltimore, MD (US); Ryan Scott Kitchen, Knoxville, TN (US); Travis McFalls, Knoxville, TN (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 436 days.

(21) Appl. No.: 17/535,766

(22) Filed: Nov. 26, 2021

(65) Prior Publication Data

US 2022/0172330 A1   Jun. 2, 2022

Related U.S. Application Data

(60) Provisional application No. 63/120,141, filed on Dec. 1, 2020.

(51) Int. Cl.
    *G06T 5/73* (2024.01)
    *G06T 5/50* (2006.01)
    *G06T 7/00* (2017.01)

(52) U.S. Cl.
    CPC .................. *G06T 5/73* (2024.01); *G06T 5/50* (2013.01); *G06T 7/0004* (2013.01);
    (Continued)

(58) Field of Classification Search
    None
    See application file for complete search history.

(56) References Cited

U.S. PATENT DOCUMENTS 10,639,740 B2   5/2020 Yoshimura et al.
2017/0341183 A1  11/2017 Buller et al.
(Continued)

FOREIGN PATENT DOCUMENTS

CN    111126242 A    5/2020
TW    I623412 B     5/2018
(Continued)

OTHER PUBLICATIONS

International Preliminary Report on Patentability issued on Jun. 15, 2023 in PCT/US2021/061323.
(Continued)

*Primary Examiner* — Jiangeng Sun
(74) *Attorney, Agent, or Firm* — Morgan, Lewis & Bockius LLP

(57) ABSTRACT

A method is provided for enhancing image resolution for sequences of 2-D images of additively manufactured products. For each of a plurality of additive manufacturing processes, the process obtains a respective plurality of sequenced low-resolution 2-D images of a respective product during the respective additive manufacturing process and obtains a respective high-resolution 3-D image of the respective product after completion of the respective additive manufacturing process. The process selects tiling maps that subdivide the low-resolution 2-D images and the high-resolution 3-D images into low-resolution tiles and high-resolution tiles, respectively. The process also builds an image enhancement generator iteratively in a generative adversarial network using training inputs that includes ordered pairs of low-resolution and high-resolution tiles. The process stores the image enhancement generator for subsequent use to enhance sequences of low-resolution 2-D images captured for products during additive manufacturing.

22 Claims, 14 Drawing Sheets

(52) U.S. Cl.
CPC .............. *G06T 2207/10048* (2013.01); *G06T 2207/10081* (2013.01); *G06T 2207/20021* (2013.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 2018/0185955 A1* | 7/2018 | Hsu | B33Y 10/00 |
| 2018/0201749 A1* | 7/2018 | Chen | C08J 9/26 |
| 2019/0299522 A1* | 10/2019 | Chapiro | B29C 70/38 |
| 2019/0355126 A1 | 11/2019 | Sun et al. | |
| 2020/0237378 A1* | 7/2020 | Liu | A61L 31/146 |
| 2020/0247063 A1* | 8/2020 | Pinskiy | G06F 18/2411 |
| 2020/0297237 A1* | 9/2020 | Tamersoy | A61B 5/7264 |
| 2021/0049397 A1 | 2/2021 | Chen | |
| 2021/0118099 A1* | 4/2021 | Kearney | A61B 6/5217 |
| 2021/0150287 A1* | 5/2021 | Baek | G06V 10/70 |
| 2021/0318673 A1 | 10/2021 | Kitchen et al. | |
| 2022/0035961 A1* | 2/2022 | Ziabari | G06N 3/045 |

FOREIGN PATENT DOCUMENTS

| | | |
|---|---|---|
| TW | I709107 B | 11/2020 |
| WO | 2019/211822 A1 | 11/2019 |
| WO | 2020/091724 A1 | 5/2020 |

OTHER PUBLICATIONS

International Search Report and Written Opinion dated Jul. 12, 2022, issued in corresponding International Patent Application No. PCT/US2021/061323.

Zhu et al., "Unpaired Image-to-Image Translation using Cycle-Consistent Adversarial Networks", Berkeley AI Research (BAIR) laboratory, UC Berkeley, pp. 1-18, Aug. 24, 2020.

"Generative Adversarial Network (GAN)", GeeksforGeeks, Jan. 15, 2019, Retrieved from the Internet:<URL: https://www.geeksforgeeks.org/generative adversarial-network-gan/>.

Office Action and Search Report issued on Feb. 17, 2023 in Taiwanese Application No. 110144864.

Bhatia et al., "Attaining Real-Time Super-Resolution For Microscopic Images Using GAN", arXiv.org, Cornell University Library, Oct. 9, 2020, XP081782517.

Clijsters et al., "In situ quality control of the selective laser melting process using a high-speed, real-time melt pool monitoring system", Int J. Adv Manuf Technol (2014) 75:1089-1101, XP055266000.

Cunha et al., "In Situ Monitoring of Additive Manufacturing Using Digital Image Correlation: A Review", Materials 2021, 14, 1511. https://doi.org/10.3390/ma14061511, XP055902373.

Extended European Search Report dated Oct. 8, 2024, issued in corresponding European Patent Application No. 21901353.9.

* cited by examiner

| Measurement | Caliper | CT Pixels | NIR Pixels | Fake CT Pixels | CT Voxel Size | NIR Voxel Size | Fake CT Voxel Size |
|---|---|---|---|---|---|---|---|
| Face 1 | 26.14 | 1369 | 428 | 1297 | 19.0μm | 61μm | 20.15μm |

DEEP LEARNING BASED IMAGE ENHANCEMENT FOR ADDITIVE MANUFACTURING

RELATED APPLICATION DATA

This application is based on and claims priority under 35 U.S.C. § 119 to U.S. Provisional Application No. 63/120,141, filed Dec. 1, 2020, the entire contents of which are incorporated herein by reference.

TECHNICAL FIELD

The disclosed implementations relate generally to additive manufacturing and more specifically to systems, methods, and user interfaces for deep learning based image enhancement for additive manufacturing.

BACKGROUND

Due to the complexity of additively manufactured parts (e.g., parts manufactured using 3-D printing), non-destructive quality control methods are very limited. The most widely used non-destructive testing method is micro-CT (Computed Tomography) scanning. Although this process provides more geometric accuracy, the process is extremely expensive and time consuming, and does not scale to large parts made of dense materials (e.g., the process is impacted by shadowing artifacts in dense materials). Some systems use digital twin 3-D volumes based on Near-Infrared (NIR) imagery. NIR post-processing provides superior pore or crack definition but less accurate Geometric Dimensioning & Tolerancing (GD&T), and does not predict post-build effects. The 3-D volumes are also limited by the resolution of the imagery. Moreover, such systems only capture data during a manufacturing process, which means that changes that occur afterwards are not captured. For example, these systems do not capture re-melting of metals, which alters the final geometry.

SUMMARY

In addition to the problems set forth in the background section, there are other reasons where an improved system and method of inspecting additive manufacturing quality are needed. For example, because existing techniques rely on postmortem analysis of additively manufactured products, context information is absent for proper root-cause analysis. The present disclosure describes a system and method that addresses the shortcomings of conventional methods and systems.

The present disclosure describes a system and method that addresses some of the shortcomings of conventional methods and systems. The current disclosure uses deep neural net technology called a Generative Adversarial Network (GAN) to simultaneously increase the resolution of the NIR imagery, model post-build effects (such as re-melting or shrinkage) and convert the data to a format usable by off-the-shelf CT analysis tools. The techniques described herein enable large 3-D volumes to be processed by the neural net. The disclosure describes two distinct processing pipelines. The first pipeline is used for training and testing (an ongoing process, which improves the quality of the algorithm), and the second pipeline is used for in-situ deployment.

The current disclosure uses computer vision, machine learning, and/or statistical modeling, and builds digital models for in-situ inspection of additive manufacturing quality, in accordance with some implementations. The techniques described herein may be used to enhance lower resolution NIR images to CT-like quality and resolution. Additionally, the output can be analyzed with off-the-shelf CT scan software. The techniques require negligible cost per build for highly accurate comprehensive GD&T. The techniques enhance feature detection for features, such as cracks or pores. The techniques can also be used for predicting post-layer effects, such as re-melting, expansion, and shrinkage based on training from previous builds. The system according to the techniques described herein, unlike CT, does not produce scanning artifacts like CT, and help reduce noise in the output.

According to some implementations, the invention uses one or more cameras as sensors to capture sequenced images (e.g., still images or video) during additive manufacturing of products. The temporally sequenced images are processed as a multi-dimensional data array with computer vision and machine/deep learning techniques to produce pertinent analytics, and/or predictive insights. This includes locating specific features (e.g., defects) and determining the extent of those features to assess quality.

In some implementations, images of additive manufacturing processes in progress are processed using a trained computer vision and machine/deep learning algorithms, to produce defect characterization. In some implementations, the computer vision and machine/deep learning algorithms are trained to determine product quality based on images of in-progress additive manufacturing processes.

In accordance with some implementations, a method executes at a computing system. Typically, the computing system includes a single computer or workstation, or plurality of computers, each having one or more CPU and/or GPU processors and memory. The method of machine learning modeling implemented does not generally require a computing cluster or supercomputer.

In some implementations, a computing system includes one or more computers. Each of the computers includes one or more processors and memory. The memory stores one or more programs that are configured for execution by the one or more processors. The one or more programs include instructions for performing any of the methods described herein.

In some implementations, a non-transitory computer readable storage medium stores one or more programs configured for execution by a computing system having one or more computers, each computer having one or more processors and memory. The one or more programs include instructions for performing any of the methods described herein.

Thus methods and systems are disclosed that facilitate in-situ inspection of additive manufacturing processes. The discussion, examples, principles, compositions, structures, features, arrangements, and processes described herein can apply to, be adapted for, and be embodied in adaptive manufacturing processes.

BRIEF DESCRIPTION OF THE DRAWINGS

For a better understanding of the disclosed systems and methods, as well as additional systems and methods, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
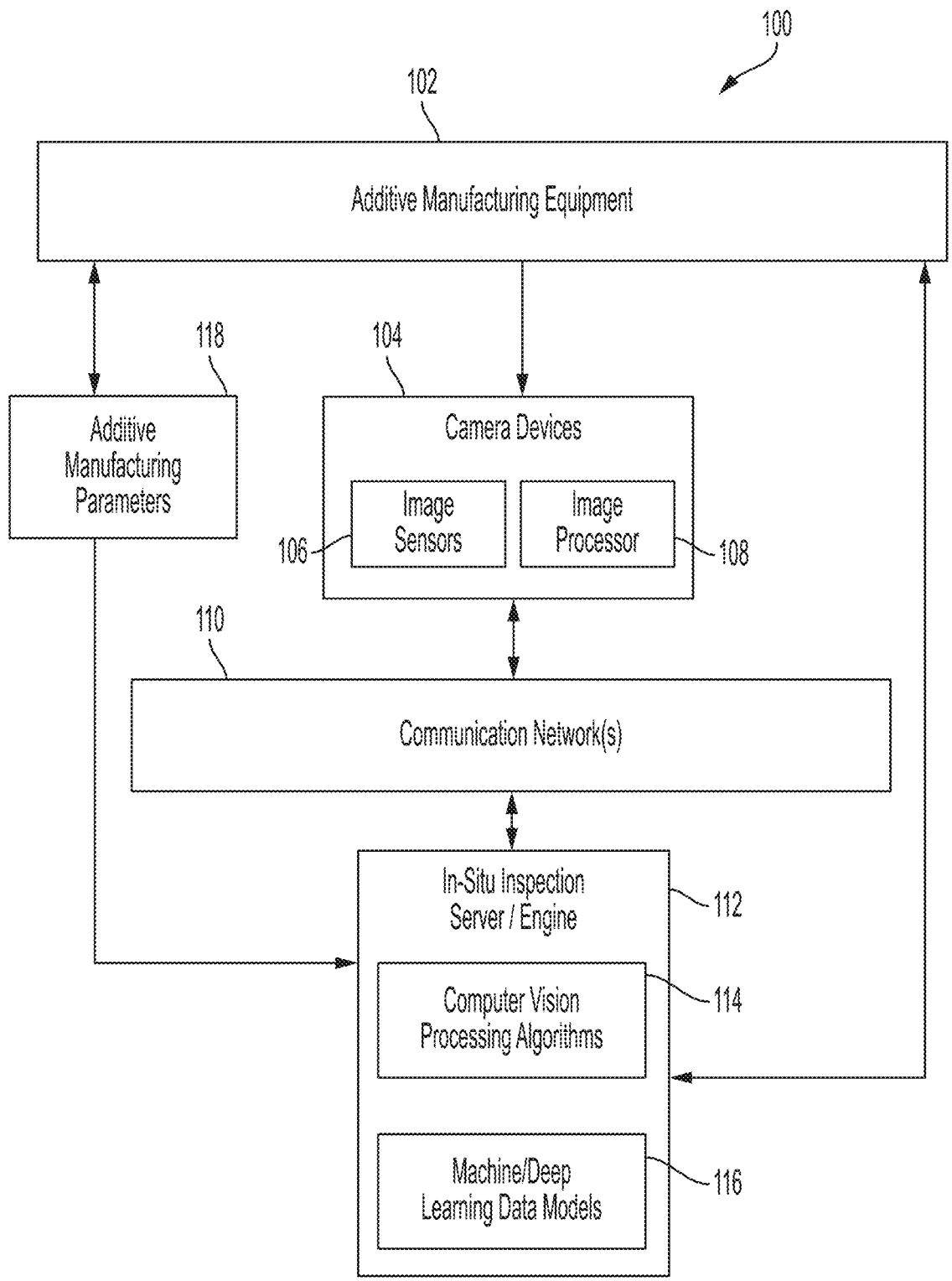
FIG. 1 is a block diagram of a system for in-situ inspection of additive manufacturing processes, in accordance with some implementations.

FIG. 1 is a block diagram of a system 100 for in-situ inspection of additive manufacturing processes, in accordance with some implementations. Additive manufacturing equipment 102 is monitored by one or more camera devices 104, each device 104 including one or more image sensors 106 and one or more image processors 108. Data collected by the camera devices is communicated to an in-situ inspection server 112 using a communication network 110. The additive manufacturing equipment 102 uses a set of additive manufacturing parameters 118, which can be updated dynamically by the in-situ inspection server 112. The manufacturing parameters can include detailed process flows that define both the materials used, and how the processes are performed.

The in-situ inspection server 112 uses some standard computer vision processing algorithms 114, as well as some machine/deep learning data models 116.

The process captures images in-situ, during the additive manufacturing operation and applies standard image processing techniques to accentuate features (e.g., Gaussian blur, edge detection of electrode and weld pool, signal to noise filtering, and angle correction). The process uses temporal cross-correlations to align image stack or video frames to geometry. In some implementations, this information is fed to one or more mounted robotic cameras for accurate image capture. The system converts temporal image trends to stationary signals by taking the temporal derivative of the images. The system trains a convolutional neural network on sequential, lagged image batches with 3-D convolutions (e.g., pixel position, intensity, and color/spectral band). In some implementations, the machine/deep learning data models 116 output the probability of certain events (e.g., either yes/no or type of defect).

Figure 2A:
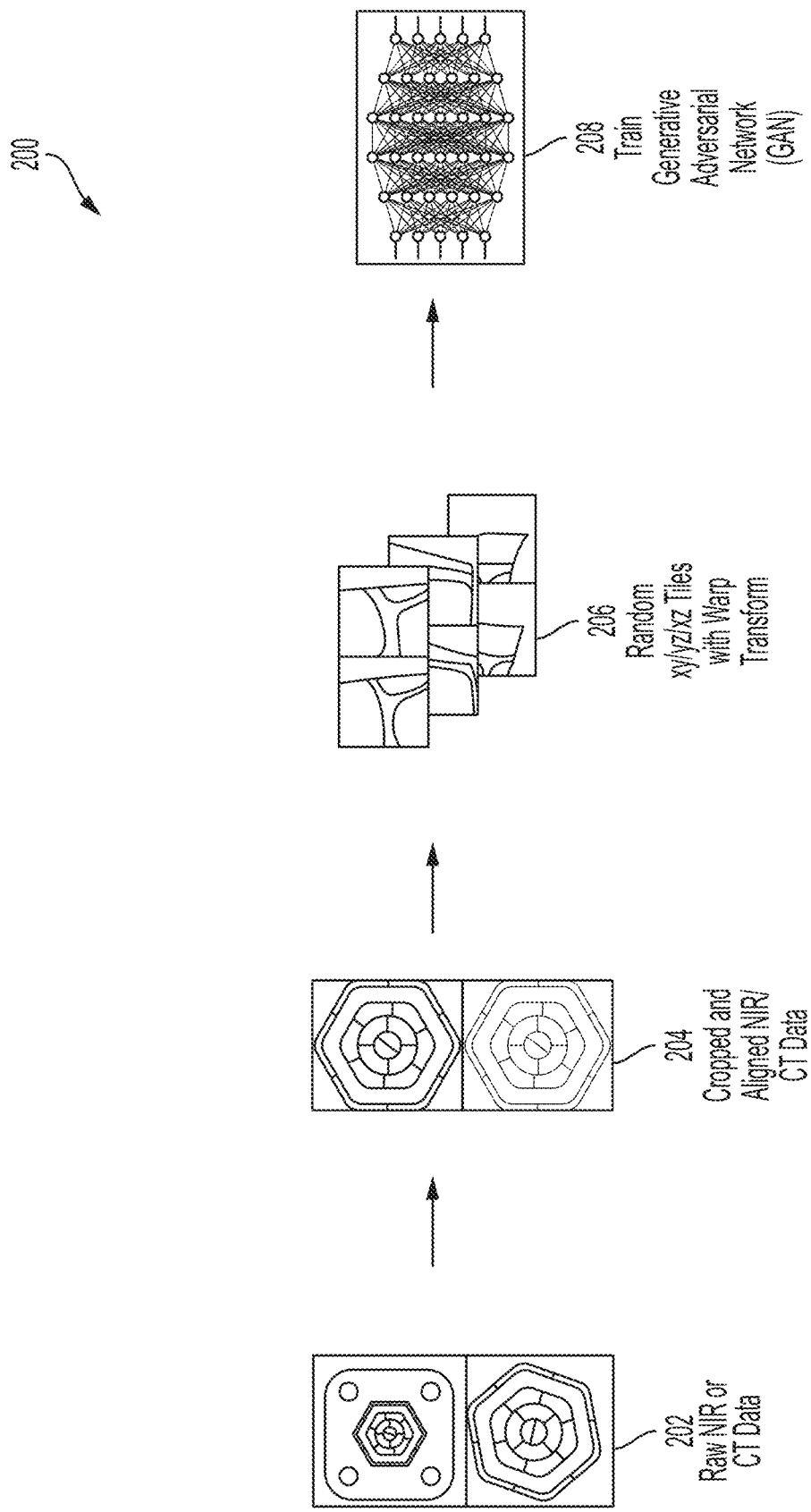
FIG. 2A is a block diagram of a system for training a Generative Adversarial Network (GAN) for enhancing image resolution for sequences of 2-D images of additively manufactured products, in accordance with some implementations.

FIG. 2A is a block diagram of a system 200 for training a Generative Adversarial Network (GAN) for enhancing image resolution for sequences of 2-D images of additively manufactured products, in accordance with some implementations. Raw input images 202 (e.g., NIR images or CT data) are obtained from in-situ monitoring of additive manufacturing processes. Some implementations acquire initial data (the raw input images 202) by capturing NIR images (while building products) at a predetermined resolution (e.g., 60 μm (micro-meter) resolution). Some implementations perform micro-CT scan of printed parts or products at a second predetermined resolution (e.g., 20 μm resolution). The micro-CT scans are typically generated after a product is fully constructed. In some implementations, each NIR image corresponds to an X-Y cross-section (e.g., a layer) of a product. The input images are cropped and aligned to obtain NIR and CT data 204, which is subsequently tiled (e.g., random x-y, y-z, or x-z tiles) with warp transforms to obtain intermediate tiled inputs 206. These tile stacks (each representing a portion of the overall image) are used to train a Generative Adversarial Network 208. For example, each NIR image corresponds to a X-Y cross-section or layer of a product, and the CT image stack includes a scan of layers of the product bottom-up (i.e., bottom-most layer first, followed by a subsequent layer, all the way to the top-most layer). Aligning the NIR images and the CT scan images includes matching the images layer-by-layer, bottom-most to the top-most layer. Some implementations augment the input data (data used to train neural networks) by modifying the input data to increase the amount of data available for training. Some implementations rotate, adjust position, and/or scale the input data to obtain further data for training. In some instances, these operations do not actually provide additional data. For example, when the input data or image contains circles or hexagons, rotation does not provide additional data or information. Some implementations augment the data by warping the data. In some instances, warping produces additional information (e.g., an H-shape) that is used to train the neural networks. Warping is used to augment the training dataset to increase diversity in training data. Warping (sometimes called perspective warping) includes affine transformation(s) of the input data. Some implementations warp the NIR images (or tiles obtained from the NIR images), and the CT images (or tiles obtained from the CT images), to produce corresponding warped images (or tiles) for training. The warp operation takes a 2-D image and projects it into a 3-D space, which makes the image appear as if it is being viewed at an angle. Since the final image is projected back into two dimensions, warping produces images which appear stretched, twisted, bent, or otherwise deformed. Some implementations perform the warp operation identically on both CT and NIR input data, creating paired ground-truth for geometries or features that are unseen in the original data.

Some implementations pair data sources by assembling NIR images into a 3-D volume, align NIR and micro-CT volumes, and/or upscale NIR images to CT resolution (e.g., using basic interpolation). Some implementations extract training sets by randomly selecting tiles from the paired 3-D volumes described above, randomly manipulating data to augment the dataset, and/or dividing the dataset into training, testing, and validation sets of data. Some implementations subsequently use the training sets to train the GAN 208.

Figure 2B:
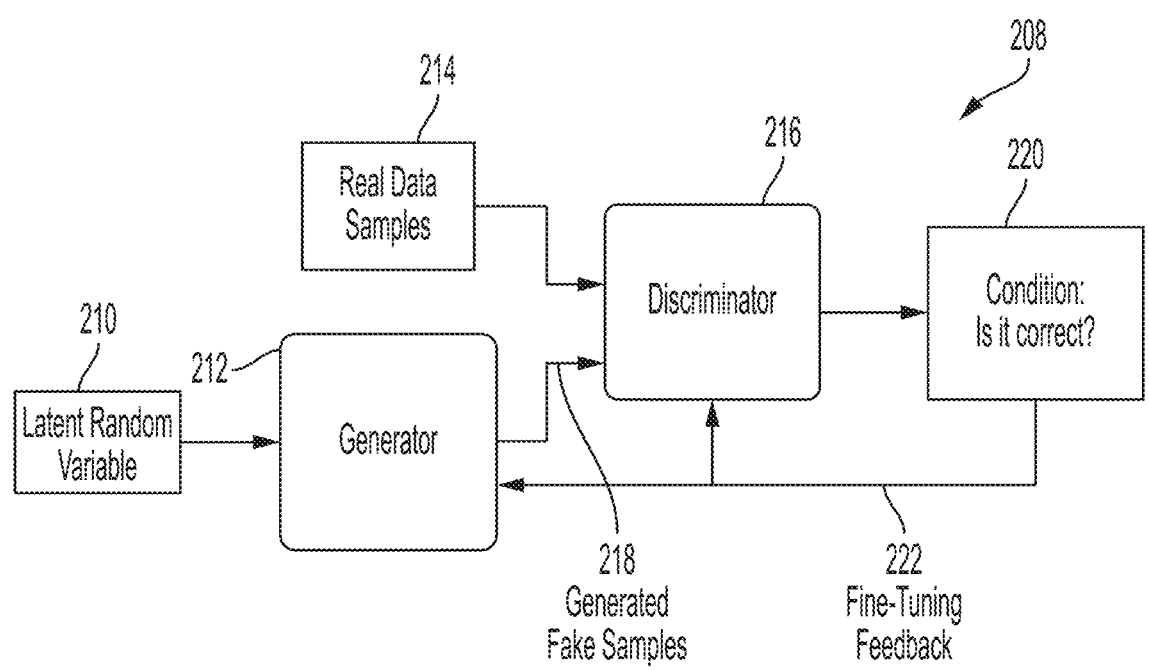
FIG. 2B is a block diagram of the Generative Adversarial Network (GAN) shown in FIG. 2A, in accordance with some implementations

FIG. 2B is a block diagram of the Generative Adversarial Network (GAN) 208 shown in FIG. 2A, in accordance with some implementations. A Generative Adversarial Network, or GAN, is an advanced method of training a Deep Convolutional Neural Network (CNN). Instead of using a single network, two separate networks (a generator 212 and a discriminator 216) are trained. The generator 212 is the network that will ultimately be used after training. The generator 212 takes input data 210 (e.g., Near-Infrared or NIR images), processes the input data 210, and generates samples 218 (e.g., fake or artificial CT data). The results 218 are considered "fake" data because it is generated (not an actual CT scan). The discriminator 216 takes in an original "real" sample 214 or a "fake" generated sample 218 (or both simultaneously), and attempts to determine if the data is "real" or "fake". The two networks are trained simultaneously. The generator 212 is trained based on its ability to "trick" the discriminator 216 into believing its data is "real", while the discriminator 216 is trained on its ability to discern "real" from "fake". This results in both models or networks becoming increasingly accurate. The model is considered "Converged" or "Fully trained" (state shown by block 220) when the accuracy of both networks has stabilized (e.g., the accuracy does not change for several iterations). In some cases, convergence occurs when the discriminator is correct about 50% of the time. Until the networks converge, the state shown in block 220 provides fine-tuned feedback 222 to the generator 212 and the discriminator 216. In some implementations, a human developer validates the quality of the "fake" data results. During the GAN training process, the network utilizes the training dataset (described above) to train the network, and the independent validation dataset (also described above) to measure accuracy. The training model produces statistics (e.g., accuracy and/or loss) for each input. In some implementations, once the training has reached a point where a developer believes the output quality is good, testing is performed using a completely separate dataset. This dataset is essentially a dry run of the production model, testing not only the neural net itself but the full image processing and assembly pipeline.

Figure 2C:
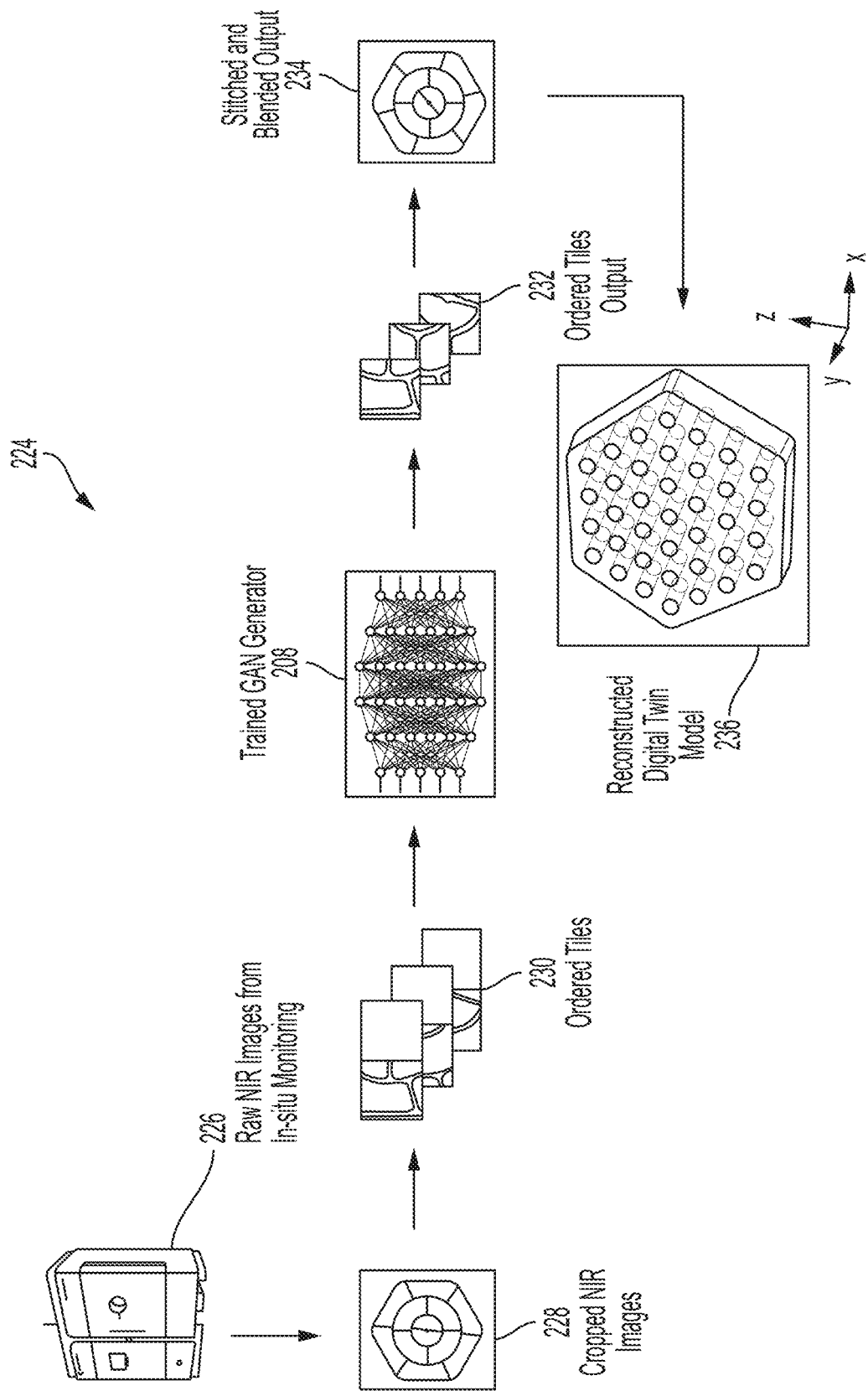
FIG. 2C is a block diagram of a system for using a Generative Adversarial Network (GAN) for enhancing image resolution for sequences of 2-D images of additively manufactured products, in accordance with some implementations.

FIG. 2C is a block diagram of a system 224 for using the Generative Adversarial Network (GAN) 208 for enhancing image resolution for sequences of 2-D images of additively manufactured products, in accordance with some implementations. Raw input images 226 (e.g., NIR images) are obtained from in-situ monitoring of an additive manufacturing process of a product. Some implementations capture layer images for a product during an additive manufacturing process. Some implementations resize the images (e.g., increase the size by 3 times). The input images are cropped to obtain cropped NIR images 228. Some implementations segment the cropped images 228 into numbered tiles (e.g., as 256×256 pixel tiles), extracting a tile for each predetermined number of pixels (e.g., every 128 pixels). In some implementations, the tiles overlap (e.g., 4 tiles overlap) to eliminate edge effects. Subsequently, the cropped NIR images are ordered and/or tiled to obtain ordered tiles 230. The ordered tiles 230 are input to the trained GAN generator 208 (which is run in an inference mode) to obtain ordered tiles output 232. The ordered tiles output 232 are stitched and blended to obtain output 234, which is used to reconstruct a digital twin model 236 (e.g., the stitched images are appended to form a 3-D volume). Details of the tiling, and image stitching algorithm are described below in reference to FIGS. 4 and 5, according to some implementations. In some implementations, each tile is input to the GAN separately. The input images are sliced into tiles, each tile is processed by the GAN, and then the output tiles are reassembled into a final image. This is done for each image in the image stack (of tiles), and then finally the stack of output images is combined into a 3-D volume.

Figure 3:
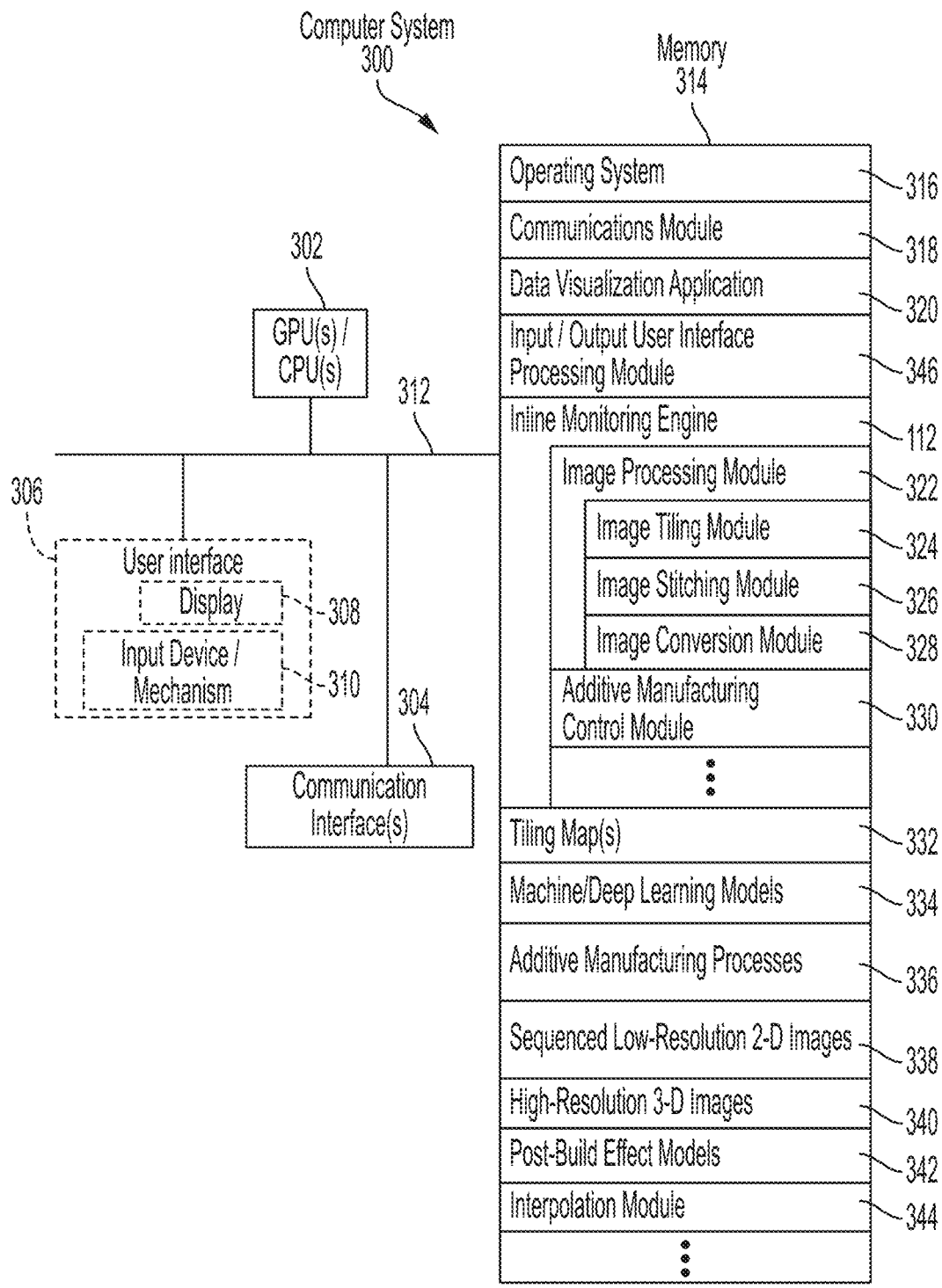
FIG. 3 is a block diagram of a computing device according to some implementations.

FIG. 3 is a block diagram illustrating a computing device 300 in accordance with some implementations. Various examples of the computing device 300 include high-performance clusters (HPC) of servers, supercomputers, desktop computers, cloud servers, and other computing devices. The computing device 300 typically includes one or more processing units/cores (CPUs and/or GPUs) 302 for executing modules, programs, and/or instructions stored in the memory 314 and thereby performing processing operations; one or more network or other communications interfaces 304; memory 314; and one or more communication buses 312 for interconnecting these components. The communication buses 312 may include circuitry that interconnects and controls communications between system components. The computing device 300 may include a user interface 306 comprising a display device 308 and one or more input devices or mechanisms 310. In some implementations, the input device/mechanism includes a keyboard. In some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display).

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the GPU(s)/CPU(s) 302. The memory 314, or alternatively the non-volatile memory device(s) within the memory 314, comprises a non-transitory computer readable storage medium. In some implementations, the memory 314, or the computer-readable storage medium of the memory 314, stores the following programs, modules, and data structures, or a subset thereof:

- an operating system 316, which includes procedures for handling various basic system services and for performing hardware dependent tasks;

a communications module 318, which is used for connecting the computing device 300 to other computers and devices via the one or more communication network interfaces 304 (wired or wireless) and one or more communication networks, such as the Internet, other wide area networks, local area networks, metropolitan area networks, and so on;

an optional data visualization application or module 320 for displaying visualizations of additive manufacturing defects for in-situ inspection;

an input/output user interface processing module 346, which allows a user to specify parameters or control variables;

an in-situ inspection engine 112 (sometimes called inline monitoring engine, described above in reference to FIG. 1). In some implementations, the inspection engine 112 includes an image processing module 322 and/or an additive manufacturing control module 330, as described below with respect to FIG. 10. In some implementations, the image processing module 322 includes an image tiling module 324, an image stitching module 326, and/or an image conversion module 328, as described in more detail below;

tiling maps 332, as used by the image tiling module 324, for subdividing low-resolution 2-D images to obtain low-resolution (LR) tiles, and/or for subdividing high-resolution 2-D images to obtain high-resolution (HR) tiles;

machine/deep learning/regression models 334 (e.g., the models 116 in FIG. 1, and as further described below) that includes weights and input vectors;

additive manufacturing processes 336;

sequenced low-resolution 2-D images 338;

high-resolution 3-D images 340 that includes slices of high-resolution 2-D images;

optionally, post-build effect models 342; and/or an interpolation module 344.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above. The operations of each of the modules and properties of the data structures shown in FIG. 3 are further described below, according to some implementations.

Although FIG. 3 shows a computing device 300, FIG. 3 is intended more as a functional description of the various features that may be present rather than as a structural schematic of the implementations described herein. In practice, and as recognized by those of ordinary skill in the art, items shown separately could be combined and some items could be separated.

In some implementations, although not shown, the memory 314 also includes modules to train and execute models described above in reference to FIGS. 1 and 2A-2C. Specifically, in some implementations, the memory 314 also includes a stochastic sampling module, a coding framework, one or more convolutional neural networks, a statistical support package, and/or other images, signals, or associated data.

Figure 4:
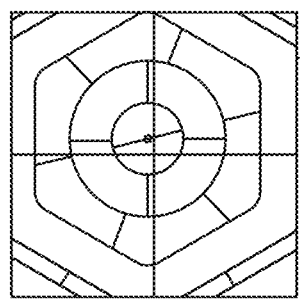
FIG. 4 is an illustration of example tiles of images of layers of additive manufacturing processes, according to some implementations.
Figure 4:
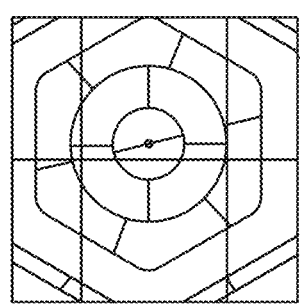
Figure 4:
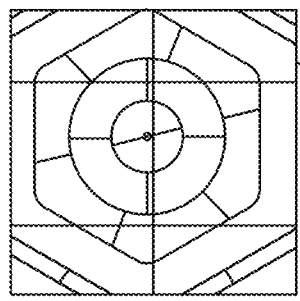
Figure 4:
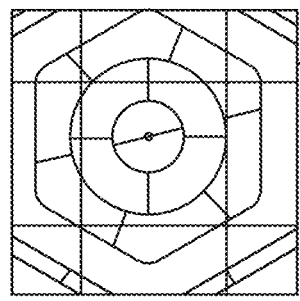

FIG. 4 is an illustration of example tiles of images of layers of additive manufacturing processes, according to some implementations. The images 400, 402, 404, and 406 may correspond to different layers of the same product (or a different product built using the same additive manufacturing process or different additive manufacturing processes), according to some implementations. Each image is tiled according to a tile size that is a fraction of an image size (e.g., one-fourth or one-eighth of an image size), according to some implementations. Some implementations use the same tile size for tiling all images. Some implementations use different tile sizes for different products, and/or different additive manufacturing processes. In FIG. 4, the images 400, 402, 404, and 406, correspond to separate sets of tiles from the same image. Some implementations combine these sets of tiles to create a set of tiles which overlap in each direction. For example, high-resolution images generally include 10 or more total tiles on each axis, for a total of 400 tiles (4*100). Since the tiles are offset, there are tiles on the edge which have half thickness in one or more directions. In some implementations, the GAN requires the tiles to be of uniform size, so these tiles are either not included in the calculation (e.g., the cropped portions are filled with zeros), or the cropped portion is mirrored from the non-cropped portion.

Figure 5:
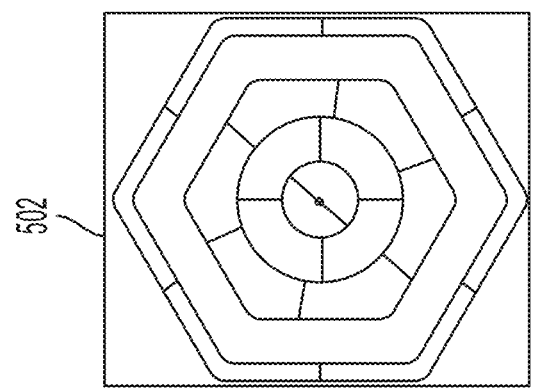
FIG. 5 is an illustration of stitching together image tiles for additive manufacturing processes, according to some implementations.
Figure 5:
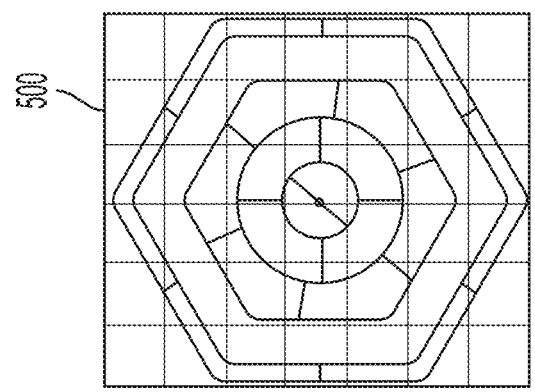

FIG. 5 is an illustration of stitching of tiles of images of layers of additive manufacturing processes, according to some implementations. Some implementations use an image stitching algorithm that provides superior blending of tiled images compared to conventional methods with no loss of detail. Each pixel in the output image is generated by a weighted sum of its value in each of four or more overlapping tiles. The weight for each tile is linearly proportional to the distance from the center of the tile to eliminate edge effects. FIG. 5 shows an initial tiled image 502 that can be processed by the stitching algorithm 500 to produce a stitched tiled image, according to some implementations. In FIG. 5, the image 500 shows overlapped tiles, with the edge from each overlapping tile appearing in the image. Some implementations generate the image 500 by stitching the 4 overlapping tile configurations and blending them together by taking the average or mean of the 4 images (each image correspond to an overlapping tile). FIG. 5 also shows a second image 502 that is generated using an improved blending method. In some implementations, prior to stitching each set of tiles, the tiles are multiplied by a "blending tile" generated by a mathematical formula, an example of which is shown below:

$$BlendTile[x, y] = \left(1 - abs\left(1 - 2 * \frac{x}{width}\right)\right) * \left(1 - abs\left(1 - 2 * \frac{y}{height}\right)\right) \quad (1)$$

In the equation (1) shown above, x and y are x, y coordinates (of a pixel of an image), and width and height are width and height (sizes of dimensions) of a tile that corresponds to the pixel. In some implementations, the equation (1) produces a weighting image with a scale from 0 to 1 determined by x and y distance from the center of the image. In some implementations, the images produced by these 4 configurations are added together, so that the total weight for each pixel is 1.

Figure 6A:
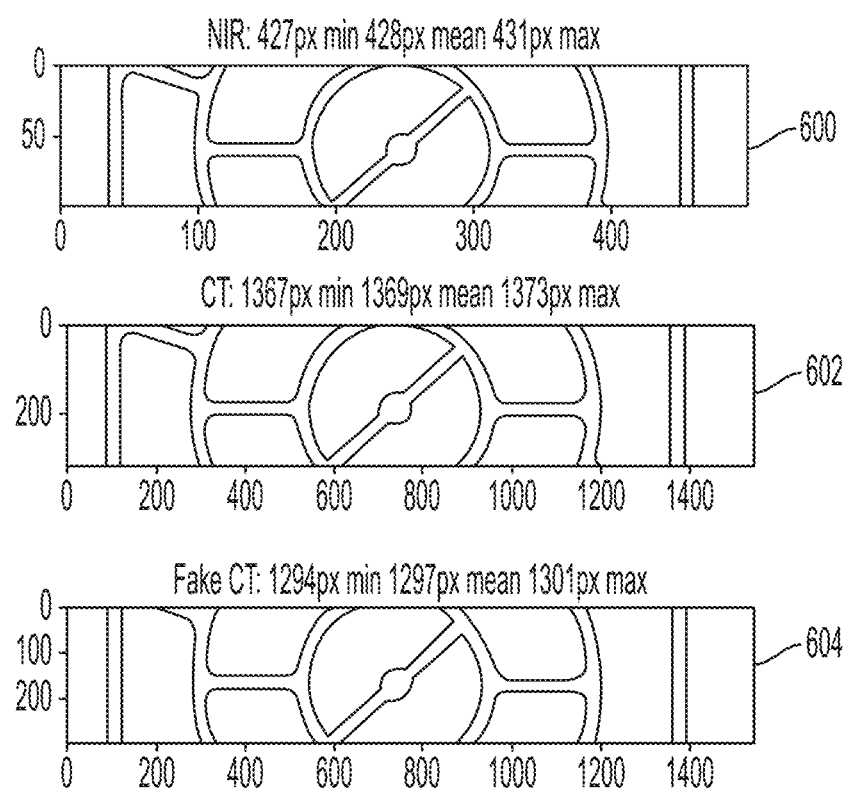
FIG. 6A is an illustration of wall thickness measured for NIR, micro-CT scan, and artificial high-resolution images, according to some implementations.
Figure 6B:
FIG. 6B shows a table with example measurements based on a geometric comparison test, according to some implementations.

FIGS. 6A and 6B show results of testing the output of the trained neural network (e.g., the GAN 208), according to some implementations. The test results are based on caliper measurements for NIR, CT, and fake CT (artificial images created by the generator of a GAN 208), according to some implementations. The test results are from a geometric comparison test that included calibrating pixel sizes by measuring the full width of parts in pixels, measuring thickness of thin walls (the smallest possible feature) using calipers, and comparing the measurements for the output of the system to wall thicknesses measured for NIR and micro-CT scan, according to some implementations. FIG. 6A shows a cross section of an additively manufactured part which was measured width-wise using calipers, according to some implementations. The width-wise measurement is divided into the mean pixel width of this region in each image to determine a voxel size. By utilizing the whole width of the part, the measurement error ratio due to a +/−1 pixel edge definition uncertainty is minimized to a fractional +/−2/(total number of pixels). In FIG. 6A, the first image 600 is an NIR image (an input image with low-resolution, and includes a minimum of 427 pixels, 228 mean number of pixels, and 431 maximum number of pixels). The second image 602 corresponds to a CT scan image (sometimes called a CT image, which is a higher resolution image that includes a minimum of 1,367 pixels, a maximum of 1,373 pixels, and a mean of 1,369 pixels). The third image 604 corresponds to the output generated by the system (a fake CT image, which includes a minimum of 1,294 pixels, a maximum of 1,301 pixels, and a mean of 1,297 pixels). The resolution is shown on the y-axis of each of the images 600, 602, and 604. The input image 600 has a caliper measurement of 660 μm, and the fake CT image 604 has a caliper measurement of 626 μm±40 μm. As illustrated, the resolution of the NIR image is low (0-100 units), whereas the resolution of the fake CT image (close to 300 units) is similar to that of the CT image 602. The x-axis in the images 600, 602, and 604 corresponds to a linear dimension of a layer of a product or a part built by additive manufacturing.

FIG. 6B shows a table 606 of measurements of a face ("Face 1") of the product or part whose cross-section is shown in FIG. 6A, according to some implementations. The table 606 shows a caliper value of 26.14 units, the number of CT pixels is 1,369, the number of NIR pixels is 428, the number of fake CT pixels is 1,297, the CT voxel size is 19.0 μm, the NIR voxel size is 61 μm, and the fake CT voxel size is 20.15 μm. The Table 606 shows the numbers used to calculate the voxel size of the imagery shown in FIG. 6A, according to some implementations.

Figure 7:
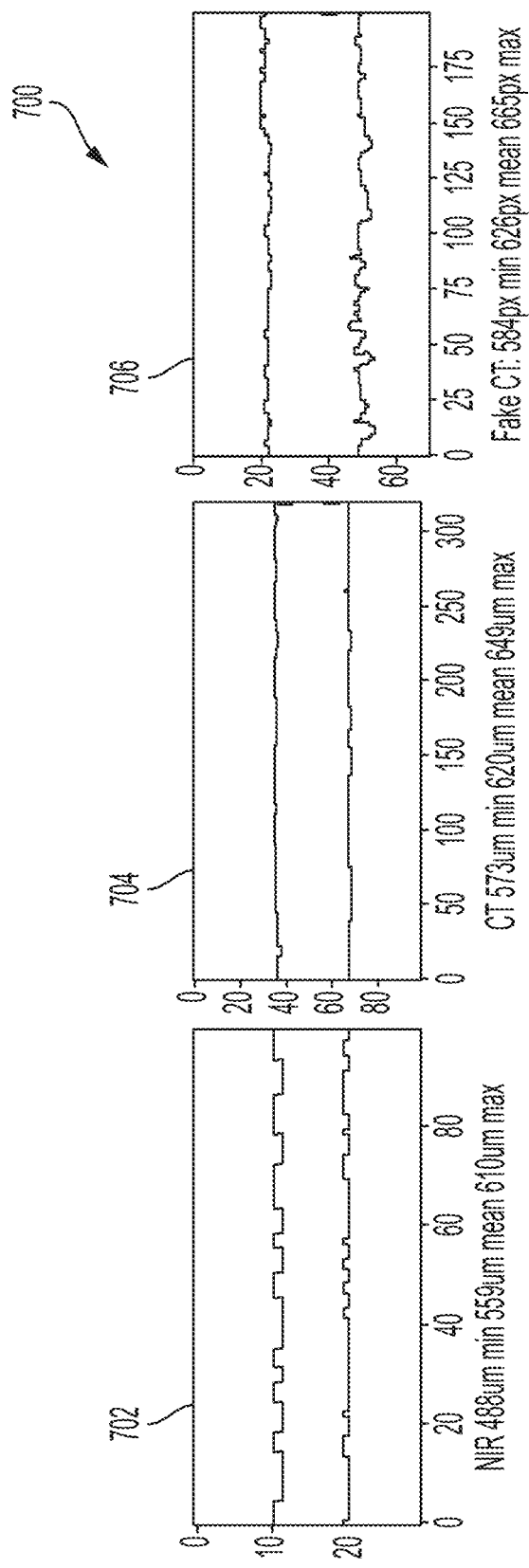
FIG. 7 shows example visualizations of wall thickness measurements, according to some implementations.

FIG. 7 shows example thickness measurements 700 using NIR, CT, and fake CT data for a same location for the part in FIGS. 6A and 6B, according to some implementations. In FIG. 7, graph 702 corresponds to the input NIR image 600, graph 704 corresponds to the CT image 602, and graph 706 corresponds to the fake CT image 604, according to some implementations. Each graph or image includes the maximum, minimum, and mean thickness measurement over the region. The measurement was compared to caliper measurements from the same location to determine accuracy, as described above in reference to FIGS. 6A and 6B.

Figure 8B:
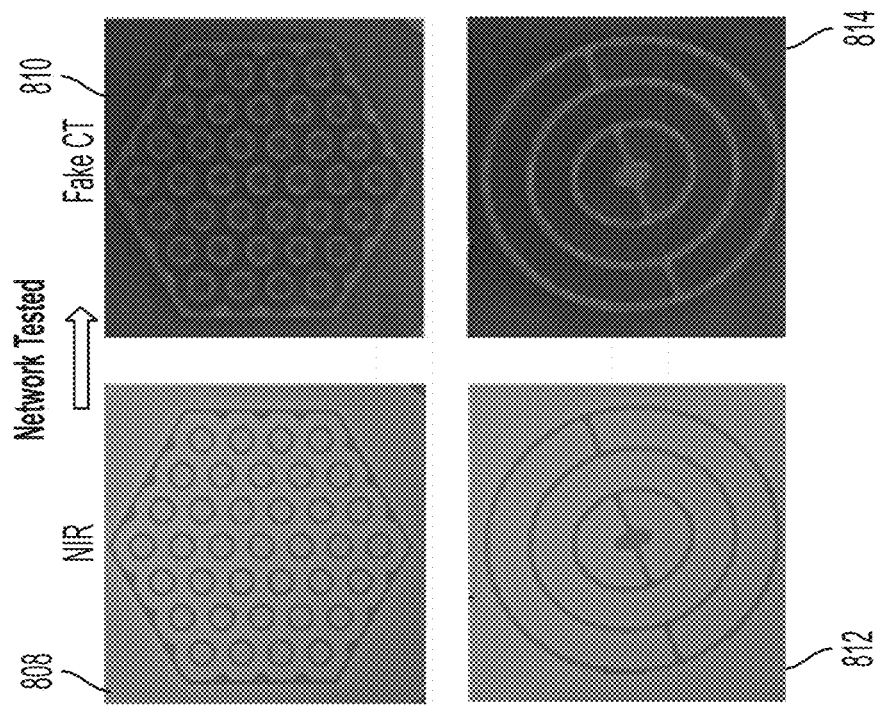
FIGS. 8A and 8B show examples of artificial high resolution images, according to some implementations.
Figure 8A:
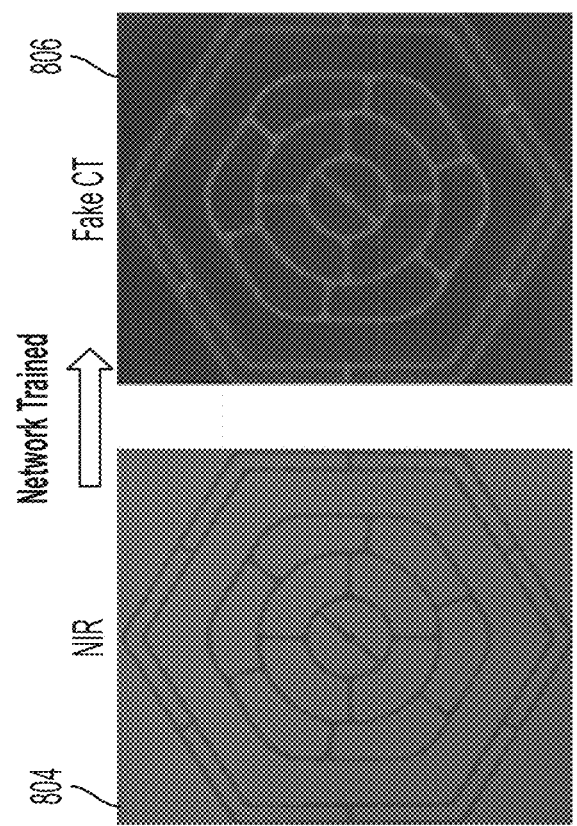

FIGS. 8A and 8B show examples of artificial high resolution images, according to some implementations. FIG. 8A shows an NIR image 804, which is input into a trained network that is trained on CT data from earlier builds, which generates a fake CT image 806 (an artificial image that matches a CT image). The resolution and/or quality of the fake CT image matches that of a real CT image, when the network converges. FIG. 8B shows output of the network that is trained as described in reference to FIG. 8A, when tested on different geometries (i.e., the network is tested on multiple geometries not included in the training set). For example, the input image 808 generates the image 810, and the input image 812 generates the image 814, using the network trained as described in FIG. 8A.

Figure 9:
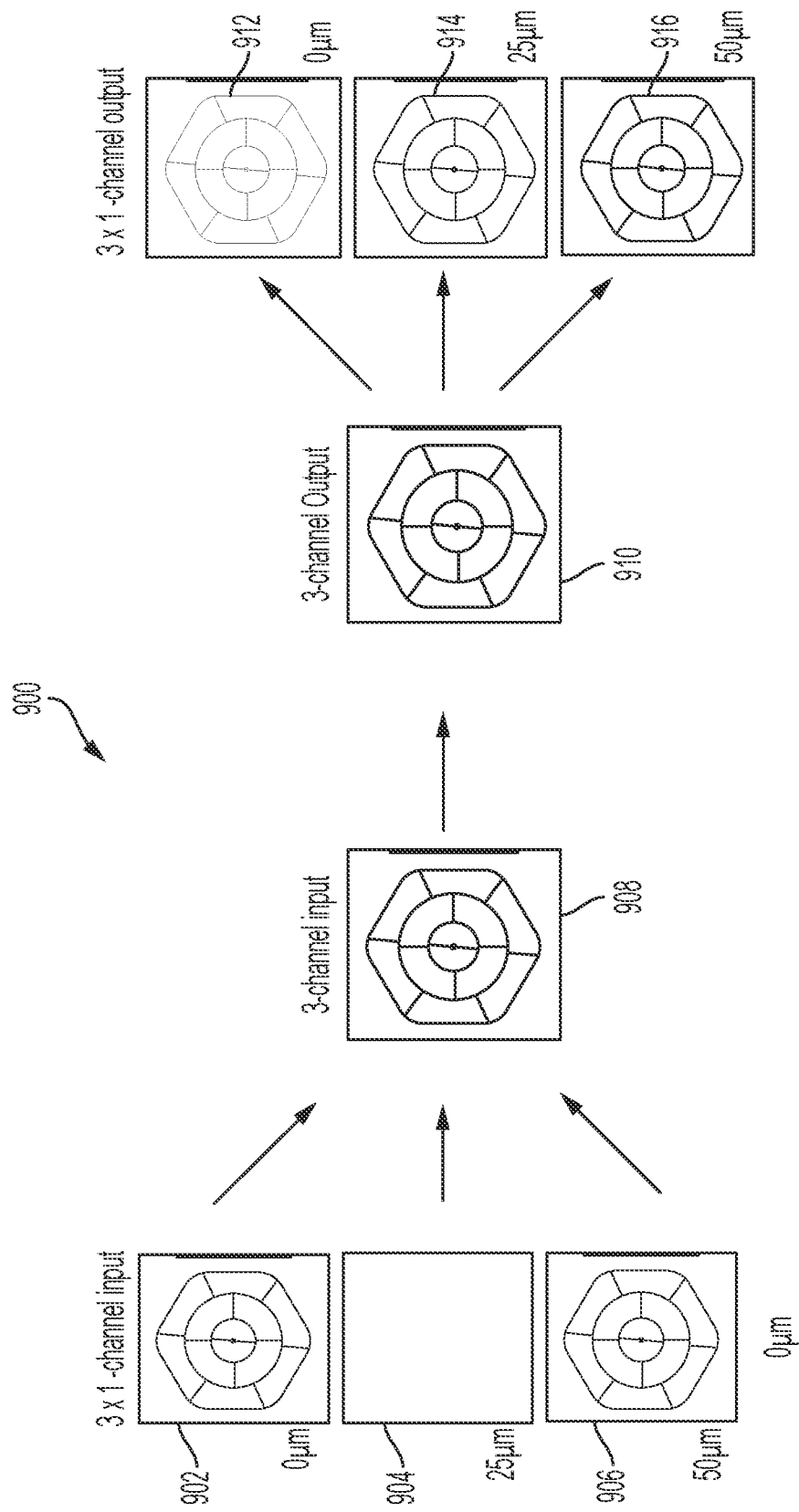
FIG. 9 is a schematic diagram of a method for Z-axis upscaling (interpolation), according to some implementations.

FIG. 9 is a schematic diagram of a system 900 for Z-axis upscaling (interpolation), according to some implementations. Some implementations use a separate neural network (e.g., a neural network other than the GAN 208 described above). Some implementations train and use the GAN 208 for Z-axis upscaling. In some implementations, the separate network is trained to not only increase resolution on the X and Y axes, but also to interpolate between print layers on the Z axis. In experiments, the results show continued GD&T accuracy, and in some instances improved pore definition. In some implementations, the interpolation operations are performed by the interpolation module 344 described above in reference to FIG. 3. In some implementations, three channel inputs (e.g., 3×1-channel inputs, including a first input channel 902 at 0 μm, a second input channel 904 at 25 μm, and a third input channel 906 at 50 μm) are combined to form a 3-channel input 908. Some implementations use one input channel for each layer of a product that is additively manufactured. Some implementations use a respective input channel for each layer at a respective distance from a predetermined location of a product that is additively manufactured. In some implementations, each input channel corresponds to a layer that is at a predetermined distance (e.g., 25 μm) with respect to another layer of a product that is additively manufactured. The 3-channel input is input to a neural network (similar to the GAN 208) that is trained to interpolate (similar to producing a higher-resolution image) between print layers in the Z axis, and output a 3-channel output 910 that is split into 3×1-channel output (images 912, 914, and 916, at 0 μm, 25 μm, and 50 μm, respectively).

Figure 10:
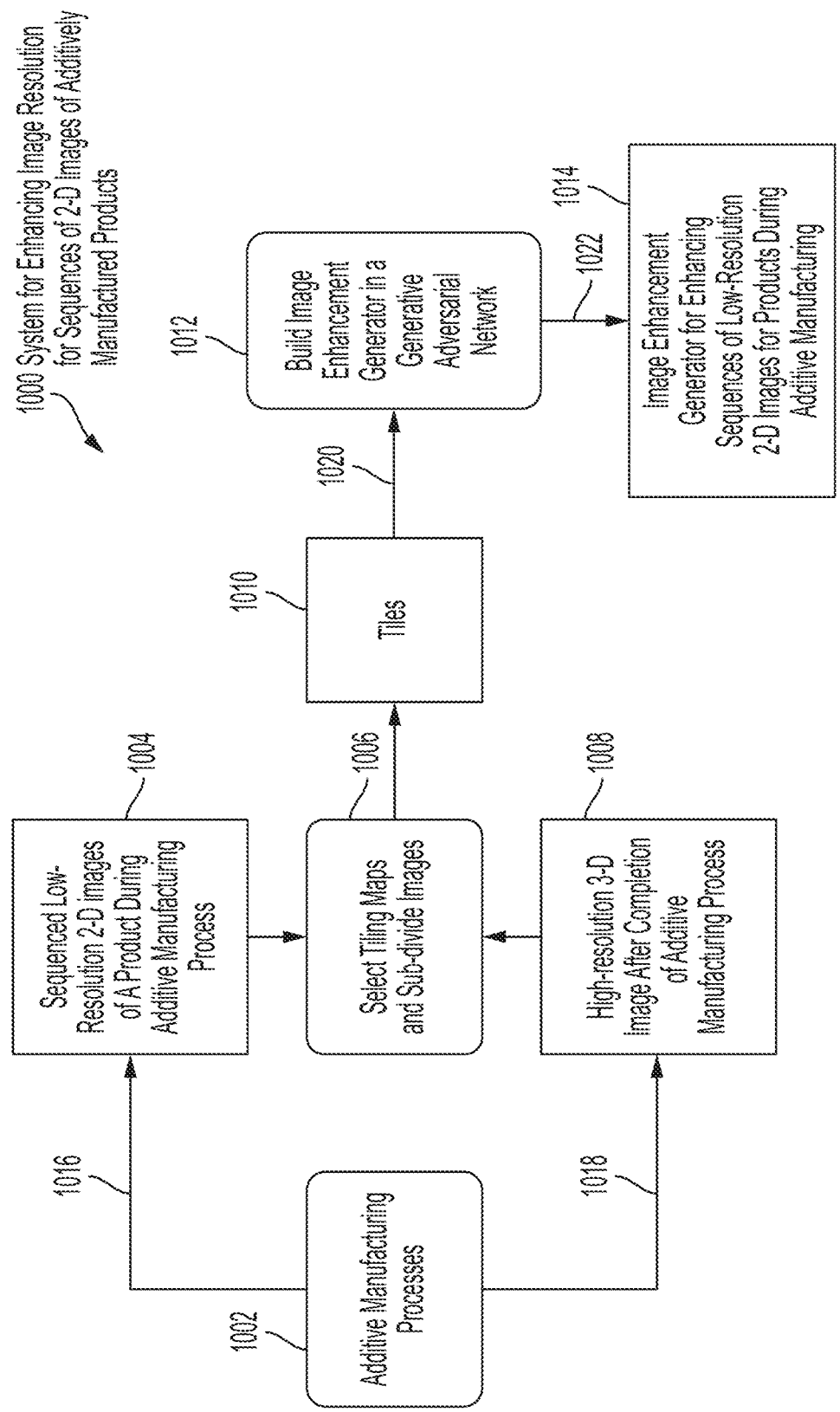
FIG. 10 is a block diagram illustrating a system that trains a generative adversarial network for enhancing image resolution for sequence of 2-D images of additively manufactured products, according to some implementations.

FIG. 10 is a block diagram illustrating a system 1000 that trains a generative adversarial network for enhancing image resolution for sequences of 2-D images of additively manufactured products, according to some implementations. In some implementations, the system 1000 (e.g., the computing device 300) performs a method for enhancing image resolution for temporal sequences of 2-D images of additively manufactured products. The method includes performing a sequence of steps for each of a plurality of additive manufacturing processes 1002. The sequence of steps includes obtaining (1016) a respective plurality of sequenced low-resolution 2-D images 1004 (e.g., the low-resolution 2-D images 338 using near-infrared (NIR) images) of a respective product during the respective additive manufacturing process. The sequence of steps also includes obtaining (1018) a respective high-resolution 3-D image 1008 (e.g., a high-resolution 3-D image 342) of the respective product after completion of the respective additive manufacturing process. The high-resolution 3-D image comprises a plurality of high-resolution 2-D images corresponding to the low resolution 2-D images. The sequence of steps also includes selecting (1006) one or more tiling maps that subdivides each of the low-resolution 2-D images into a plurality of LR tiles and subdivide each of the corresponding high-resolution 2-D images into a plurality of corresponding HR tiles. In FIG. 10, the plurality of LR tiles and the plurality of HR tiles are indicated by tiles 1010. In some implementations, the LR and HR tiles are stored separately. Some implementations compute and store ordered pairs of LR and HR tiles. The sequence of steps also includes building (1012) an image enhancement generator 1014 iteratively in a generative adversarial network using (1020) training input comprising ordered pairs of corresponding LR tiles and HR tiles. In some implementations, the sequence of steps also includes storing (1022) the image enhancement generator for subsequent use to enhance sequences of low-resolution 2-D images captured for products during additive manufacturing.

In some implementations, the generative adversarial network (e.g., the GAN 208) includes a first neural network comprising the image enhancement generator (e.g., the generator 212) and a second neural network comprising a discriminator (e.g., the discriminator 216). In some implementations, building the image enhancement generator iteratively includes: training the image enhancement generator to produce candidate high-resolution 2-D images (e.g., fake CT data) based on low-resolution 2-D images; and training the discriminator to distinguish between the candidate high-resolution 2-D images and 2-D slices of the obtained high-resolution 3-D images (real high-resolution images). Examples of the training, the low-resolution 2-D images, and the high-resolution 2-D images, are described above in reference to FIGS. 2A-2C, 6, 8A and 8B, according to some implementations. In some implementations, building the image enhancement generator ceases when output of the image enhancement generator is classified by the discriminator as a real high-resolution 3-D image for 50 percent of the candidate high-resolution 2-D images during multiple successive training iterations. For example, both models become increasingly accurate. The model is considered "converged" or "fully trained" when the accuracy of both networks has stabilized. In some implementations, a human developer accepts the quality of the "fake" data results.

In some implementations, each of the plurality of sequenced low-resolution 2-D images 1004 is a near-infrared (NIR) image of the respective product during the respective additive manufacturing process.

In some implementations, each of the high-resolution 3-D images 1008 is generated based on performing a micro-CT scan of the respective product after the respective additive manufacturing process is complete (e.g., 20 µm resolution).

In some implementations, the method further includes cropping and aligning the low-resolution 2-D images with the high-resolution 2-D images prior to subdividing into tiles. In some implementations, the method further includes, augmenting the LR tiles and HR tiles in the training input by performing a warp transformation on some of the 2-D images. In some implementations, the one or more tiling maps comprise a plurality of tiling maps, each subdividing according to a different pattern. In some implementations, the selecting tiling maps and subdividing (sometimes called tiling) are performed by the image processing module 322 (e.g., using the image tiling module 324). Examples of tiled images and tiling operations are described above in reference to FIGS. 3 and 4, according to some implementations.

Figure 11:
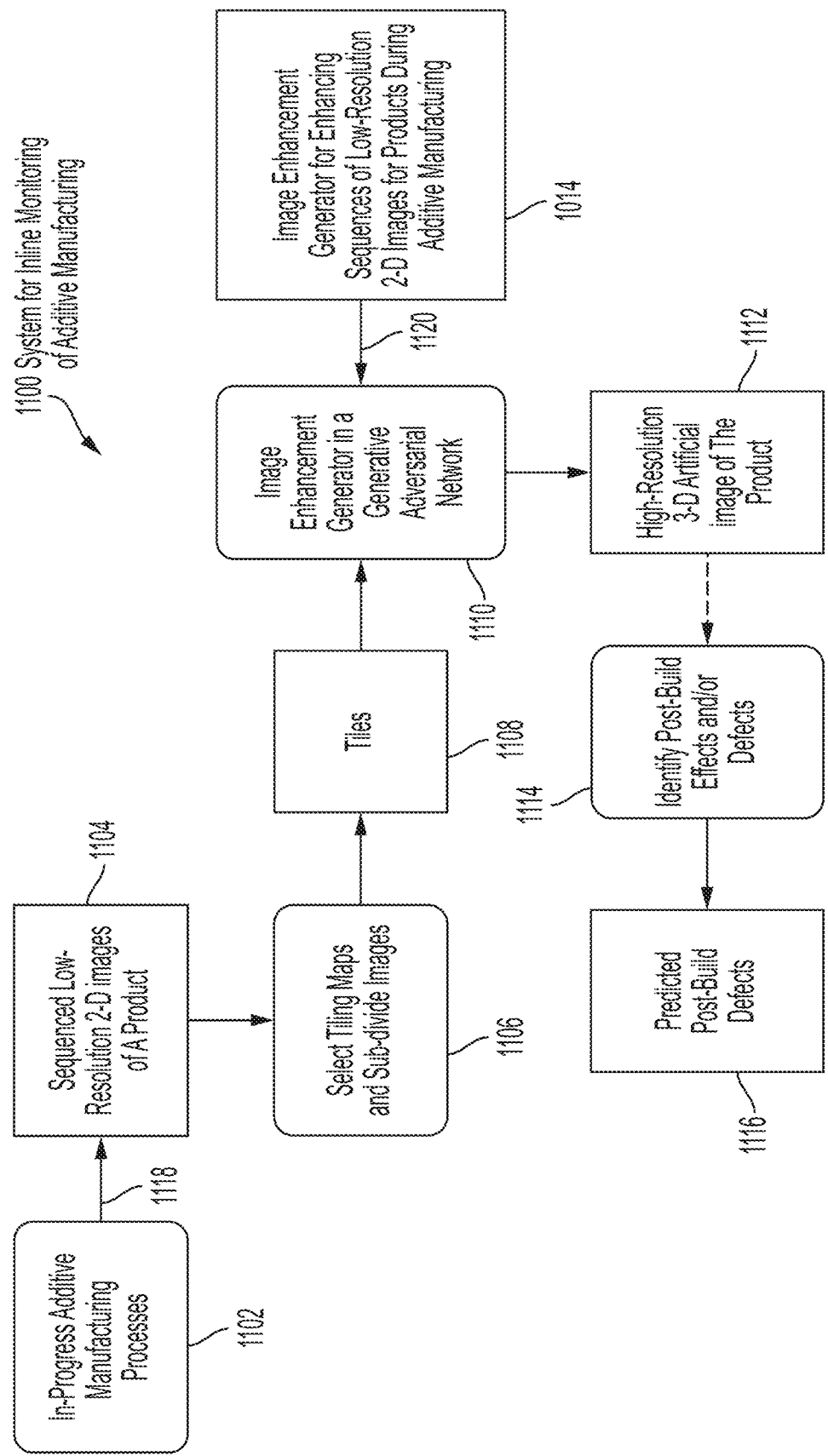
FIG. 11 is a block diagram illustrating a system that uses a generative adversarial network for enhancing image resolution for sequence of 2-D images of additively manufactured products, according to some implementations.

FIG. 11 is a block diagram illustrating a system 1100 that uses the generator from a trained generative adversarial network (e.g., the GAN trained via the process described above in reference to FIG. 10) for enhancing image resolution for sequence of 2-D images of additively manufactured products, according to some implementations. The system 1100 performs a method provided for enhancing image resolution for sequences of 2-D images of additively manufactured products. The method is performed at the computing device 300 having one or more processors and memory storing one or more programs configured for execution by the one or more processors.

The method includes obtaining (1118) a plurality of sequenced low-resolution 2-D images 1104 (e.g., Near-Infrared (NIR) imagery) of a product during an in-progress additive manufacturing process 1102 (e.g., the additive manufacturing process 336). The method also includes obtaining (1120) an image enhancement generator 1014 previously trained (e.g., trained as described above in reference to FIG. 10) as part of a generative adversarial network. The image enhancement generator is configured to accept input images of a fixed 2-dimensional size. The method also includes, selecting (1106) one or more tiling maps (e.g., using the image tiling module 324) that subdivide each of the low-resolution 2-D images into a plurality of LR tiles 1108. Spatially corresponding tiles from the low resolution 2-D images form a plurality of tile stacks. The method also includes, for each of the LR tiles, applying (1110) the image enhancement generator 1014 to generate a high-resolution 2-D artificial image tile 1112 of the product. The method also includes stitching (e.g., using the image stitching module 326) together the high-resolution 2-D artificial image tiles to form a set of high-resolution 2-D artificial layers corresponding to the low-resolution images, and stacking together the high-resolution 2-D artificial layers to form a 3-D artificial volume of the product.

In some implementations, the method further includes using the 3-D artificial volume to identify (1114) post-build effects and/or defects 1116 in the product (e.g., feature detection, such as cracks/pores, predict post-layer effects, such as re-melting, expansion, shrinkage, based on previous builds).

In some implementations, the generative adversarial network (as described above in reference to FIG. 2B) includes a first neural network comprising an image enhancement generator and a second neural network comprising a discriminator.

In some implementations, during training (examples of which are described above in reference to FIG. 10), the image enhancement generator 1014 is trained to generate candidate high-resolution 2-D images (e.g., fake or artificial CT data) based on low-resolution 2-D images (e.g., NIR images); and the discriminator is trained to discriminate between the candidate high-resolution 2-D images and slices of real high-resolution 3-D images captured after additive manufacturing processes are complete.

In some implementations, obtaining the plurality of sequenced low-resolution 2-D images 1104 includes capturing a respective low-resolution 2-D image (e.g., images shown in FIGS. 4, 5, 6, 8A, 8B, and 9) for each layer of the product during the in-progress additive manufacturing process.

In some implementations, the method further includes resizing (e.g., using the image conversion module 328) the plurality of sequenced low-resolution 2-D images.

In some implementations, each tiling map subdivides each of the low-resolution 2-D images into non-overlapping tiles. In some implementations, the one or more tiling maps include a plurality of tiling maps, each subdividing the low-resolution 2-D images according to a different pattern. In some implementations, the stitching includes: for each pixel included in two or more overlapping regions of the tiling map, generating a respective output image for the respective pixel by computing a respective weighted sum of values in the corresponding high-resolution 2-D artificial image tiles. In some implementations, computing the respective weighted sum includes: associating, for each tile's contribution to the respective weighted sum, a respective weight that is linearly proportional to a distance from a center of the respective tile.

In some implementations, the method further includes converting (e.g., using the image conversion module 328) the high-resolution 3-D artificial volume of the product into a native CT-scan format (e.g., a format that is usable by off-the-shelf CT analysis tools).

In some implementations, the method further includes interpolating (e.g., using the interpolation module 344, and as described above in reference to FIG. 9), using a trained neural network, between print layers of the in-progress additive manufacturing process (e.g., the GAN network also does interpolation between print layers in the Z-axis in addition to increasing resolution on the X and Y axes).

Some implementations iterate the processes described in reference to FIG. 11 to subsequently label and/or reject defective parts. For example, some systems identify and/or discard products that are predicted to have beyond a predetermined threshold of porosity, or a layer that does not meet a predetermined geometric standard.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for enhancing image resolution for sequences of 2-D images of additively manufactured products, the method comprising:
   for each of a plurality of additive manufacturing processes:
      obtaining a respective plurality of sequenced low-resolution 2-D images of a respective product during the respective additive manufacturing process;
      obtaining a respective high-resolution 3-D image of the respective product after completion of the respective additive manufacturing process, wherein the high-resolution 3-D image comprises a plurality of high-resolution 2-D images corresponding to the low resolution 2-D images;
      selecting one or more tiling maps that subdivide each of the low-resolution 2-D images into a plurality of LR tiles and subdivide each of the corresponding high-resolution 2-D images into a plurality of corresponding HR tiles;
   building an image enhancement generator iteratively in a generative adversarial network using training input comprising ordered pairs of corresponding LR tiles and HR tiles; and
   storing the image enhancement generator for subsequent use to enhance sequences of low-resolution 2-D images captured for products during additive manufacturing,
   wherein the method further comprises cropping and aligning the low-resolution 2-D images with the high-resolution 2-D images prior to subdividing into tiles.

2. The method of claim 1, wherein each of the plurality of sequenced low-resolution 2-D images is a near-infrared (NIR) image of the respective product captured in a temporal sequence during the respective additive manufacturing process.

3. The method of claim 1, wherein each of the high-resolution 3-D images is generated based on performing a micro-CT scan of the respective product after the respective additive manufacturing process is complete.

4. The method of claim 1, wherein the generative adversarial network includes a first neural network comprising the image enhancement generator and a second neural network comprising a discriminator.

5. The method of claim 4, wherein building the image enhancement generator iteratively comprises:
   training the image enhancement generator to produce candidate high-resolution 2-D images based on low-resolution 2-D images; and
   training the discriminator to distinguish between the candidate high-resolution 2-D images and 2-D slices of the obtained high-resolution 3-D images.

6. The method of claim 5, wherein building the image enhancement generator ceases when output of the image enhancement generator is classified by the discriminator as a real high-resolution 3-D image for 50 percent of the candidate high-resolution 2-D images during multiple successive training iterations.

7. The method of claim 1, further comprising augmenting the LR tiles and HR tiles in the training input by performing a warp transformation on some of the 2-D images.

8. The method of claim 1, wherein the one or more tiling maps comprise a plurality of tiling maps, each subdividing according to a different pattern.

9. An electronic device for enhancing image resolution for sequences of 2-D images of additively manufactured products, comprising:
   one or more processors; and
   memory storing one or more programs configured for execution by the one or more processors, the one or more programs including instructions for performing the method of claim 1.

10. A non-transitory computer-readable storage medium storing one or more programs configured for execution by one or more processors of an electronic device, the one or more programs including instructions for performing the method of claim 1.

11. A method for enhancing image resolution for sequences of 2-D images of additively manufactured products, the method comprising:
   obtaining a plurality of temporally sequenced low-resolution 2-D images of a product during an in-progress additive manufacturing process;
   obtaining an image enhancement generator previously trained as part of a generative adversarial network, wherein the image enhancement generator is configured to accept input images of a fixed 2-dimensional size;

selecting one or more tiling maps that subdivide each of the low-resolution 2-D images into a plurality of LR tiles;

for each of the LR tiles, applying the image enhancement generator to generate a high-resolution 2-D artificial image tile of the product;

stitching together the high-resolution 2-D artificial image tiles to form a set of high-resolution 2-D artificial layers corresponding to the low-resolution images; and stacking together the high-resolution 2-D artificial layers to form a 3-D artificial volume of the product, wherein the stitching comprises:

for each pixel included in two or more overlapping regions of the tiling map, generating a respective output image for the respective pixel by computing a respective weighted sum of values in the corresponding high-resolution 2-D artificial image tiles, and wherein computing the respective weighted sum comprises:

associating, for each tile's contribution to the respective weighted sum, a respective weight that is linearly proportional to a distance from a center of the respective tile.

12. The method of claim 11, wherein the generative adversarial network includes a first neural network comprising the image enhancement generator and a second neural network comprising a discriminator.

13. The method of claim 12, wherein, during training:

the image enhancement generator is trained to generate candidate high-resolution 2-D images based on low-resolution 2-D images; and the discriminator is trained to discriminate between the candidate high-resolution 2-D images and slices of real high-resolution 3-D images captured after additive manufacturing processes are complete.

14. The method of claim 11, wherein obtaining the plurality of temporally sequenced low-resolution 2-D images comprises capturing a respective low-resolution 2-D image for each layer of the product during the in-progress additive manufacturing process.

15. The method of claim 11, further comprising resizing the plurality of sequenced low-resolution 2-D images.

16. The method of claim 11, wherein each tiling map subdivides each of the low-resolution 2-D images into non-overlapping tiles.

17. The method of claim 11, wherein the one or more tiling maps comprise a plurality of tiling maps, each subdividing the low-resolution 2-D images according to a different pattern.

18. The method of claim 11, further comprising:

converting the 3-D artificial volume of the product into a native CT-scan format.

19. The method of claim 11, further comprising:

interpolating, using a trained neural network, between print layers of the in-progress additive manufacturing process.

20. The method of claim 11, further comprising using the 3-D artificial volume to identify post-build effects or defects in the product.

21. An electronic device for enhancing image resolution for sequences of 2-D images of additively manufactured products, comprising:

one or more processors; and memory storing one or more programs configured for execution by the one or more processors, the one or more programs including instructions for performing the method of claim 11.

22. A non-transitory computer-readable storage medium storing one or more programs configured for execution by one or more processors of an electronic device, the one or more programs including instructions for performing the method of claim 11.

* * * * *